United States Patent
Nemoto (10) Patent No.: US 6,484,995 B1
(45) Date of Patent: Nov. 26, 2002

(54) SEAT LIFTER WITH RATCHET-TYPE LEVER MECHANISM

(75) Inventor: Akira Nemoto, Akishima (JP)

(73) Assignee: Tachi-S Co., Ltd., Tokyo (JP)

( * ) Notice: Subject to any disclaimer, the term of this patent is extended or adjusted under 35 U.S.C. 154(b) by 12 days.

(21) Appl. No.: 09/620,217

(22) Filed: Jul. 20, 2000

(51) Int. Cl.⁷ ............................................. F16M 13/00
(52) U.S. Cl. ........................ 248/421; 248/422; 248/396; 248/398
(58) Field of Search ................................. 248/421, 422, 248/419, 393, 394, 396, 398; 74/109, 530, 89.17; 297/344.12, 344.13, 344.14, 344.15, 367; 296/65.01, 65.09

(56) References Cited

U.S. PATENT DOCUMENTS

| | | | |
|---|---|---|---|
| 4,128,225 A | * 12/1978 | Kluting et al. | 248/421 |
| 4,487,390 A | * 12/1984 | Miyashita | 248/396 |
| 4,572,468 A | * 2/1986 | Lange et al. | 248/394 |
| 4,648,656 A | * 3/1987 | Kimura | 297/337 |
| 4,767,156 A | * 8/1988 | Yamada et al. | 297/313 |
| 5,366,196 A | * 11/1994 | Mitschelen et al. | 248/424 |
| 5,547,158 A | * 8/1996 | Uchimoto | 248/396 |
| 5,882,061 A | * 3/1999 | Guillouet | 296/65.05 |
| 6,276,650 B1 | * 8/2001 | Kojima et al. | 248/429 |
| 6,290,198 B1 | * 9/2001 | Kojima | 248/422 |

FOREIGN PATENT DOCUMENTS

| | | |
|---|---|---|
| JP | 62-36654 | 9/1987 |
| JP | 63-21457 | 6/1988 |

* cited by examiner

*Primary Examiner*—Anita King
*Assistant Examiner*—Gwendolyn Baxter
(74) *Attorney, Agent, or Firm*—Browdy and Neimark (57) ABSTRACT

A seat lifter for height adjustment of vehicle seat, which has a lifter linkage for vertical movement of the seat and a drive mechanism therefor. The lifter linkage includes a pair of links, a bell crank portion formed in one of the two links, and a rotation transmission link element including a sector gear which is operatively connected with the bell crank portion. The drive mechanism comprises a ratchet-type lever mechanism operatively connected via a brake unit with the lifter linkage, the arrangement of which ratchet-type lever mechanism is such that only one-stroke operation of a lever causes a bifurcated ratchet pawl to rotate so as to bring a selected one of its two pawl portions to engagement with a ratchet gear wheel, thereby allowing for automatically selecting a desired operative direction without any switch-over operation and then continuously transmitting a certain amount of rotation force to the lifter linkage, so that the vehicle seat can easily be raised or lowered to a certain level.

9 Claims, 4 Drawing Sheets

SEAT LIFTER WITH RATCHET-TYPE LEVER MECHANISM

BACKGROUND OF INVENTION

1. Field of the Invention

The present invention relates to a seat lifter (or seat height adjuster) for adjustment in height of an automotive seat and a lever drive mechanism provided in the seat lifter, which is driven by an operation lever for actuation of the seat lifter for the height adjustment of seat. Particularly, the invention is directed to a seat lifter having forward and rearward links movable interlockingly for adjustment in height of the seat and also to a ratchet-type lever mechanism adaptable for use in the seat lifter to cause such interlocking movement of those two links.

2. Description of Prior Art

A seat height adjuster or what is known as a seat lifter is incorporated in automotive seat to enable an occupant on the seat to selectively adjust the height of seat according to his or her physique and seating posture. In the seat lifter, typically known is a linkage-type seat lifter having forward and rearward links which are interlockingly movable and pivotally coupled with the forward and rearward portions of the seat, respectively, so that the seat may be raised and lowered via those two links. This seat lifter includes plural transmission gears (reduction gears and the like), a brake unit, and a drive mechanism provided with a lever or handle, wherein the drive mechanism is operatively connected through the transmission gears and bake unit to the forward and rearward links. Thus, the drive mechanism is operable by a user who handles its lever to cause both of the two links to move in synchronized way, thereby selectively raising and lowering the seat to a desired point of level.

In this construction of seat lifter, a load is directly transmitted to the drive mechanism via the foregoing constituent elements, and therefore, a much force is required on the user's part to operate the lever or handle. This poses an unfavorable bar to a smooth and easy operation.

Conventionally, to avoid such defective aspect, a ratchet-type lever mechanism has been employed, which utilizes a known ratchet gear comprising a ratchet gear and ratchet pawl so as to limit the rotation of a lever to one operative direction. With this mechanism, one can simply rotate an operation lever repeatedly in vertical direction, with a small force, due to the combination of ratchet and lever, so that a rotational force is smoothly transmitted to the seat lifter for adjustable vertical movement of the seat to a desired level.

In ordinary, such known ratchet-type lever mechanism requires switching over the direction of rotation of the ratchet gears through operation of secondary associated lever or button. This secondary lever or button is normally disposed adjacent to the main operation lever of the lever mechanism. In most instances, however, the main operation lever of this kind is situated in a narrow space between the lateral side of seat cushion and the door or wall of automobile, which results in a user having to grope for that secondary lever or button to switch over the ratchet gears. Most possibly, this will be a issue of poor usability of the mechanism in that it frequently forces a user to feel for the secondary lever without ascertaining it with his or her own eyes, with the result that the user will erroneously switch over the secondary lever to a wrong operative position. It is therefore of a high likelihood that the user has not noticed this error until he or she handles the main operation lever and then needs to again switch over the secondary lever to a right operative position, which raises a troublesome aspect or a poor usability as well. Further, the provision of such secondary switch-over lever or button leads inevitably to a complicated structure of the ratchet-type lever mechanism on the whole.

Also, with regard to the conventional structure of seat lifter itself, the forward and rearward links thereof are connected, via transmission gears (reduction gears), to the ratchet-type lever mechanism. The gears are prone to wabbling or rattling due to clearances among the gears, and there is the likelihood that the stability or seating touch of seat will be degraded.

SUMMARY OF THE INVENTION

In view of the above-stated drawbacks, it is a primary purpose of the present invention to provide an improved seat lifter with ratchet-type lever mechanism which is easy to operate and simplified in structure.

In order to achieve such purpose, a seat lifter in accordance with the present invention is basically comprised of:

a linkage means for operative connection with a vehicle seat, the linkage means including a first link means and a second link means, each being to be pivotally connected with forward and rearward sides of the seat, respectively, such as to allow rotative vertical motion of the linkage means, wherein one of those first and second link means is formed with a bell crank portion in an integral manner;

a drive means operatively connected with the linkage means;

wherein the linkage means includes a rotation transmission link means operatively connected between the linkage and drive means such that an operative rotation force applied from the drive means is transformed into such rotative vertical motion of linkage means;

a brake means for providing a braking action to the rotative vertical motion of linkage means;

the rotation transmission link means including a sector gear means which is in a meshed engagement with the brake means; and the drive means comprising a ratchet-type lever mechanism which includes:

a support base means;

a ratchet gear wheel means having: a central axis portion rotatably supported by the support base means and securely connected with the brake means; and an outer gear teeth defined circumferentially thereof;

a ratchet base means attached rotatably around the central axis portion of the ratchet gear wheel means;

a lever means attached rotatably around the central axis portion of the ratchet gear wheel means;

a bifurcated ratchet pawl means pivotally attached on the ratchet base means, the bifurcated ratchet pawl means having first and second pawl portions extending from one side thereof, wherein the bifurcated ratchet pawl means is operatively connected with the lever means at another side thereof opposite to that one side, with such an arrangement that the bifurcated ratchet pawl means is selectively rotatable from a neutral position where it is normally out of engagement with the ratchet gear wheel means, so as to bring a selected one of the first and second pawl portions to engagement with the outer gear teeth of ratchet gear wheel means;

a first biasing means for normally biasing the ratchet base means in a direction to the foregoing neutral position; and a second biasing means for normally biasing the lever means to a neutral non-use position.

Accordingly, by initially rotating the lever means in a selected one of two directions, a selected one of the first and second pawl portions is brought to engagement with the outer gear teeth of ratchet gear wheel means, so that a user can readily select a desired corresponding direction for operation of the drive means or ratchet-type lever mechanism without any switch-over operation, and then, by continuing to rotate the lever means, the linkage means is moved in a selected one of upward and downward directions, thereby allowing the user to adjust the height of seat. Further, the seat lifter per se is simplified in structure since the linkage means may be basically formed only by the first and second link means and the rotation transmission link means, without requiring no other transmission gear mechanism, so that the seat lifter can be easily assembled with a less amount of parts and fittings required.

In this connection, the foregoing rotation transmission link means may further include a connecting link means having one end pivotally connected with the sector gear means and another end pivotally connected with the bell crank portion formed with one of the first and second link means. Or, this rotation transmission link means may be defined integrally in one of the first and second link means such that the sector gear means is integrally formed with the bell crank portion.

Another various advantages and features of the present invention will become apparent from reading of the descriptions hereinafter, with reference to the annexed drawings.

DETAILED DESCRIPTION OF PREFERRED EMBODIMENTS OF THE INVENTION

Referring to FIGS. 1 through 7, there is, by way of example, illustrated one best mode of seat lifter, as generally designated by (1), for use in an automotive seat (S) in accordance with the present invention. The seat lifter (1) includes a lifter linkage (10) as a basic means for causing vertical movement of the seat (S). In accordance with the present invention, a novel ratchet-type drive mechanism (18) is provided for operative connection with the linkage (10).

Figure 1:
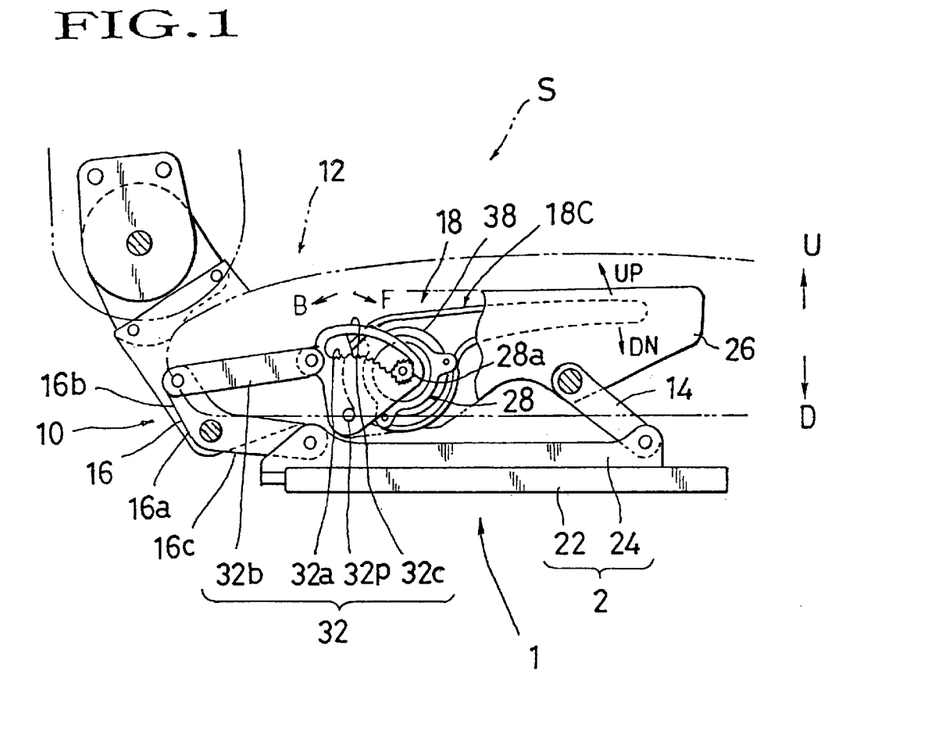
FIG. 1 is a partly broken schematic side view showing the state where a seat lifter of the present invention is provided in a vehicle seat, wherein one mode of linkage is employed.
Figure 2:
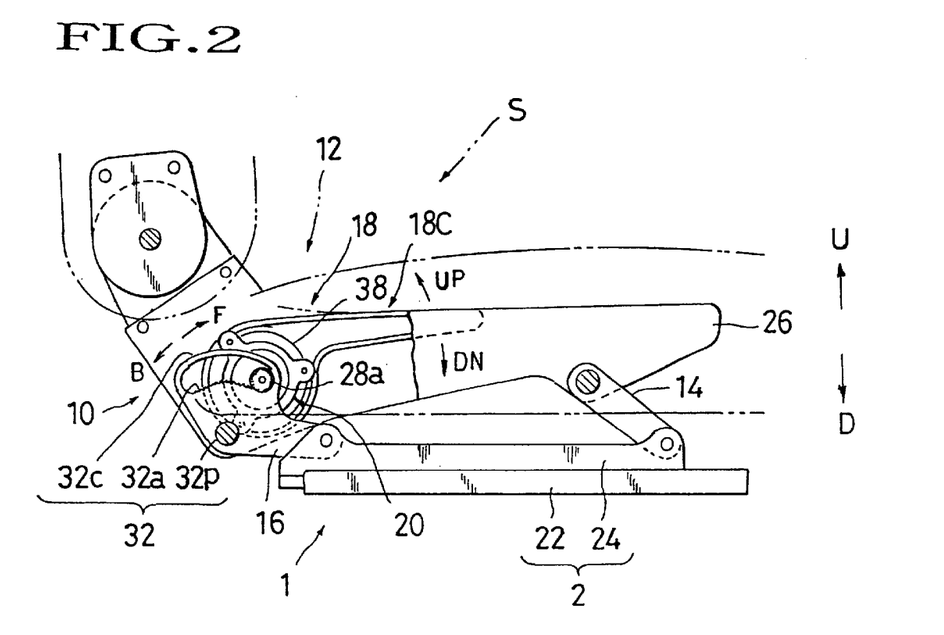
FIG. 2 is a partly broken schematic side view showing the state where the seat lifter is provided in the vehicle seat, wherein another mode of linkage is employed.

As shown in FIGS. 1 and 2, the seat lifter (1) may be provided between a seat cushion (12) of the seat (S) and a slide rail device (2) fixed on a floor of automobile (not shown), wherein the slide rail device (2) is a conventional one typically comprising an upper movable rail (24) and a lower stationary rail (22). Generally stated now, in accordance with the present invention, the linkage (10) basically may comprise a forward link (14) of rectilinear shape, a rearward link (16) of generally "L" shape, and a rotation transmission link means (generally designated by (32)). The ratchet-type drive mechanism (18) is operatively coupled with those two links (14) (16) via the rotation transmission link means (32) to be elaborated later. The forward and rearward links (14) (16) are so pivotally arranged as to support the forward and rearward sides of the seat (S), respectively, in a vertically movable manner relative to the slide rail device (2). As is known, a brake unit (20) is connected between the drive mechanism (18) and rotation transmission link means (32), providing a braking action on the drive mechanism (18) and thus acting to normally lock both links (14) (16) to a given position. This brake unit (20) has an output pinion gear (28a) which is meshed with the sector gear (32a), a part of the rotation transmission link means (32).

In both modes of FIGS. 1 and 2, while a detailed description will be made thereon later, the common basic formation of linkage (10) may be such that the forward link (14) thereof is pivotally connected at its upper end to the forward end portion of seat cushion frame (26) and also likewise connected at its lower end to the forward end portion of lower rail (24), whereas on the other hand, the rearward "L" shaped link (16) thereof has a central point (16a) pivoted on the rearward end portion of seat cushion frame (26), with a pair of upper and lower link halves (16b) (16c) defined on the opposite sides of that central point (16a). The lower link half (16c) of this rearward link (16) is pivotally connected with the rearward end portion of upper rail (24), while by contrast, the upper link half (16b) thereof assumes a bell crank portion in the rotation transmission link means (32) for operative connection with the drive mechanism (18) via the brake unit (20).

Figure 3:
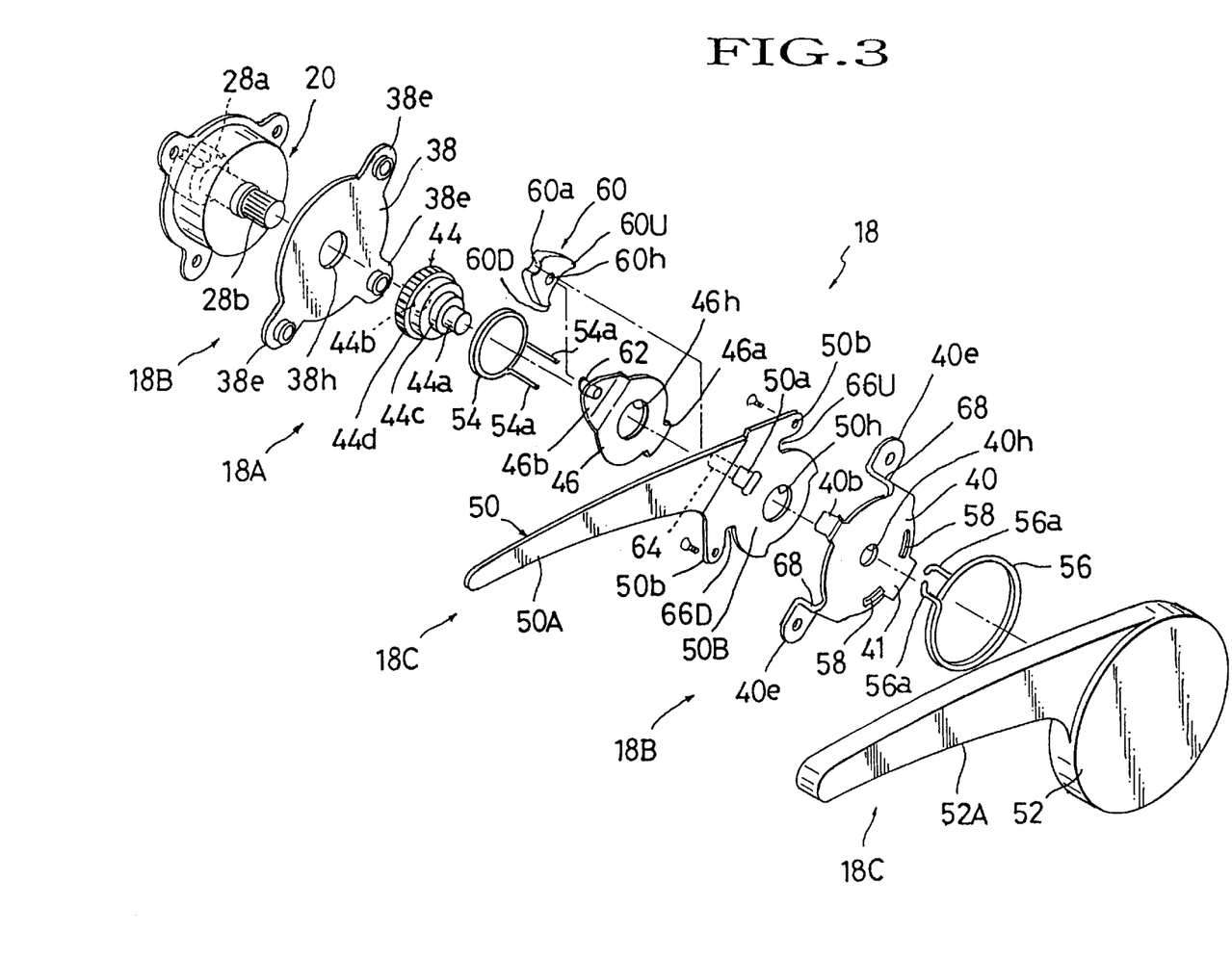
FIG. 3 is an exploded schematic perspective view of a ratchet-type lever mechanism provided in the seat lifter in accordance with the present invention.

In accordance with the present invention, a preferred mode of the drive mechanism (18) is best shown in the exploded perspective in FIG. 3, which presents a novel lever-operable ratchet gear arrangement workable with the afore-stated linkage (10). Within the gist and scopes of the present invention, the drive mechanism (18) per se is of a ratchet-gear type including a novel ratchet gear mechanism, designated generally by (18A), which allows for transmitting a rotary operation force in a selected direction to the linkage (10) by one stroke of rotation of an operation lever (18C). The drive mechanism (18) also includes a support base unit (18B) to support the ratchet gear mechanism (18A)

Specifically, as understandable from the illustrated embodiment of FIG. 3, the support base unit (18B) is comprised of outer and inner support members (40) (38) which are so secured together as to accommodate therein the ratchet gear mechanism (18A) and operation lever (18C), both of which will be elaborated later. In other words, the ratchet gear mechanism (18A) and operation. lever (18C) are both rotatably, coaxially journalled by those two support members (40) (38). The inner support member (38) has a hole (38h) formed centrally thereof, through which the serrated shaft (28b) of brake unit (20) passes, and has three coplanar securing portions (38e) projected outwardly thereof. On the other hand, the outer support member (40) has a hole (40h) formed centrally thereof in a coaxial relation with the hole (38h) of the counterpart (38) and has three angled securing legs (40e) which are all bent by a right angle in the same direction and disposed in correspondence with the respective three securing portions (38e) of the same counterpart (38). The outer support member (40) is formed at its peripheral end with a lug (40b) of generally L-shaped cross-section, with which are engaged the two end parts (56a) (56a) of a second circular return spring (56) adapted for biasingly causing the lever (18C) to return to a neutral position each time the lever is rotated and released, as will be explained.

According to the illustrated mode of the ratchet gear mechanism (18A), in brief, a ratchet gear wheel (44) and a bifurcated ratchet pawl (60) are provided on a ratchet base plate (46) for interlocking with the operation lever (18C). Specifically, the ratchet gear wheel (44) is of such a configuration that has, defined integrally at its one side, a central shaft (44a), an intermediate columnar bearing region (44c) and outer gear teeth (44d) in a coaxial relation with one another, while having, defined at its another opposite side, a serrated securing hole (44b) (see FIG. 5) coaxial with the main shaft (44a). The ratchet base plate (46) is shown as being formed with a pair of diametrically opposed first and second projections (46a).

Figure 4:
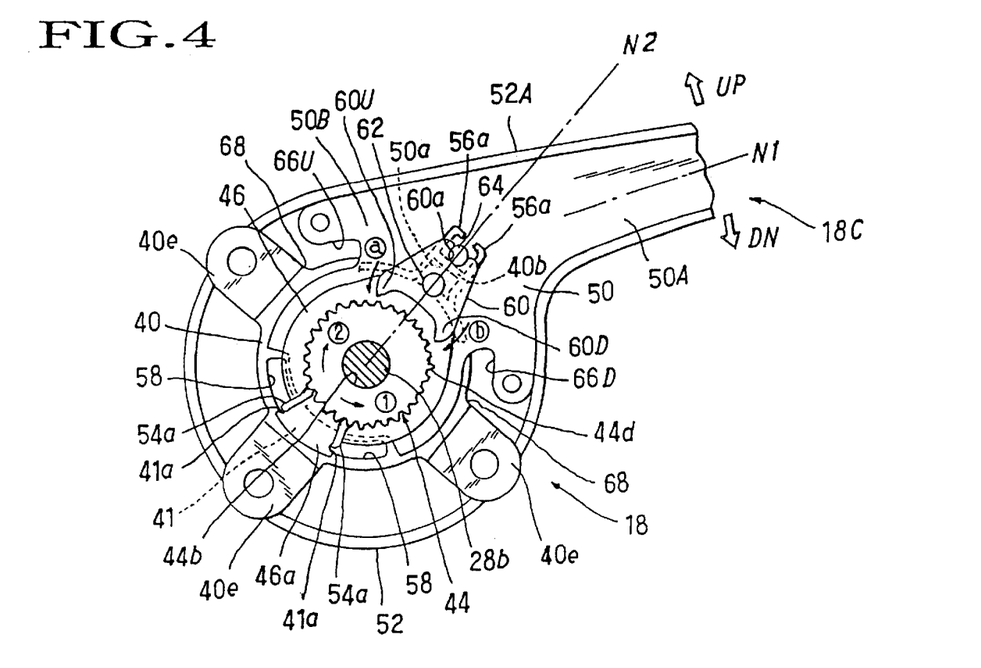
FIG. 4 is a diagram which generally shows an operative motion of the ratchet-type lever mechanism.
Figure 5:
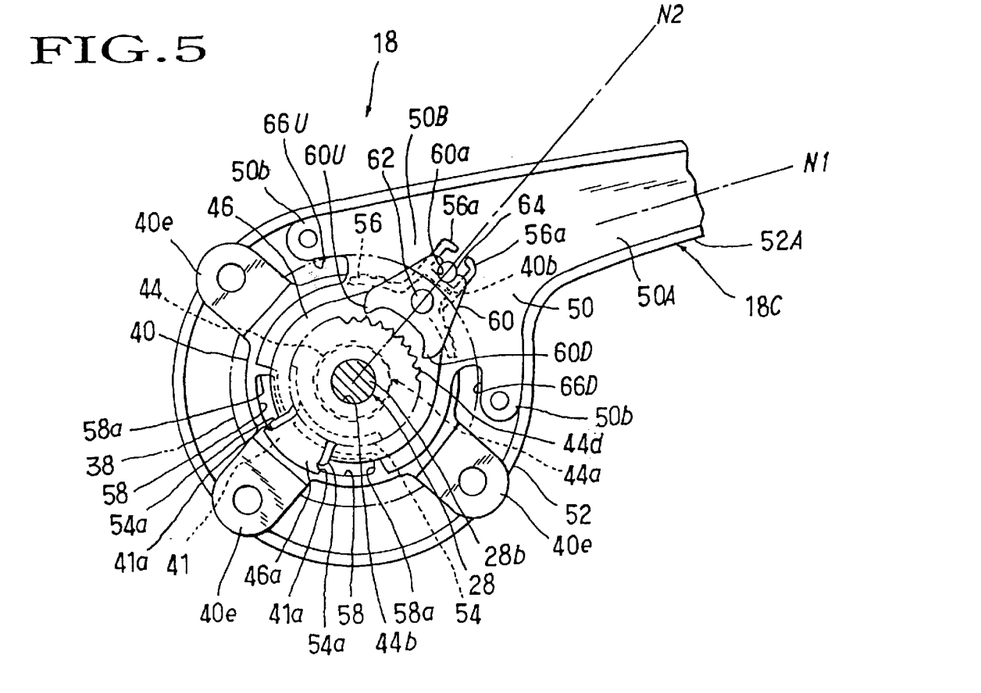
FIG. 5 is a fragmentary, partially sectioned front view of the ratchet-type lever mechanism as viewed from the inner side thereof with which a brake unit is connected, showing the state where an operation lever is located in a neutral non-position.

The ratchet gear mechanism (18A) includes a pair of spaced-apart arcuate holes (58) (58) and a securing region (41) defined therebetween, as a means for restricting the range within which the ratchet base plate (46) may be rotated about the central axis of ratchet gear wheel (44). The two arcuate holes (58) are formed and spaced from each other in one peripheral end area of inner support member (40) in a direction along a circle having its center at the hole (40h) (i.e. a center of rotation for the ratchet base plate (46)), thus leaving a securing region (41) between the two holes (58). The securing region (41) therefore has two securing sides (41a)(41a), each being defined in the corresponding one extremity of each of the two holes (58) opposite to another extremity (58a) of the same, as best seen in FIGS. 4 and 5. In the shown embodiment, two bent end portions (54a)(54a) of first circular return spring (54) are also utilized as a part of the afore-stated means for restricting the rotation range of base plate (46). That is, the end portions (54a) resiliently sandwich both lateral sides of first projection (46a) of ratchet base plate (46) and extend therefrom to the outer support member (40), passing through the respective two holes (58) there as in FIG. 4. It is observed that the end portions (54a) also resiliently sandwich both securing sides (41a) of securing region (41). With this arrangement, the ratchet base plate (46) is normally biased by the first return spring (54) to a neutral position (N2) as indicated in FIG. 4 and may be rotated against the biasing force of spring end portions (54a) within as range limited by the length of each arcuate hole (58). To precisely achieve such biasing action of return spring (54), it is preferred that the width of the first projection (46a) be equal to a width between the two securing sides (41a) of securing region (41) so as to enable the spring (54) to precisely bias the ratchet base plate (46) in the direction to the neutral position (N2).

The operation lever (18C) comprises a lever frame (50) and lever cover (52). The lever frame (50) is formed with a base section (50B) and a handle section (50A). The base section (50B) has, defined therein, a bearing hole (50h) adapted to be rotatably attached about the intermediate columnar bearing region (44c) and a pair of spaced-apart first and second notches (66U)(66D) each being so formed to slidably engage the respective two adjacent angled legs (40e) of outer support member (40). These two notches (66U)(66D) serve to allow the lever base section (50B) to be rotated without interference with the legs (40e) and limit a rotation range within which the lever (18C) may be rotated when one of them contacts a mating one of the two adjacent legs (40e) as will be explained later. Designations (50b) denote a pair of securing portions formed in the lever frame base section (50B), which are used to secure the lever frame (50) to the lever cover (52).

As best seen in FIG. 3, a hook-like lug (50a) is formed in the outer surface of lever frame base section (50B) which faces to a side externally of the seat (S), where there lie the outer plate member (40) and lever cover (52). Such lug (50a) is engaged or resiliently sandwiched by the two end parts (56a) of second return spring (56), such as to be normally biased to a point where it is in alignment with the lug (40b) of the outer support member (40). Hence, the lever frame (50) or operation lever (18C) itself is normally biased by the spring (56) to a neutral non-use position as indicated by the one-dot line (N1). In this regard, it is preferred that the hook-like lug (50a) be equal in width to the lug (40b) so as to enable the spring (56) to precisely bias the operation lever (18) in the direction to that neutral non-use position (N1). For that purpose, it is essential that the location of the lug (40b) in the outer support member (40) should be such as to set both two end parts (56a) of spring (56) at a point where they normally bias the lever frame (50) via the lug (40b) in the direction to the neutral non-use position (N1). In the present embodiment, the lug (40b) is disposed in a diametrically opposed relation with the securing region (41) with respect to the hole (40h).

On the other hand, as indicated by the phantom line in FIG. 3, a connecting pin (64) is fixed on the inner surface of lever frame base section (50B) opposite to the aforesaid outer surface of the same (50B), wherein, at that inner surface, the ratchet mechanism (18A) is disposed. The connecting pin (64) is rotatably received in the cut-out part (60a) of ratchet pawl (60), thereby placing the operation lever (18C) in an interlocking relation with the ratchet pawl (60). This is also a point for bringing the ratchet pawl (60) to and out of engagement with the ratchet gear wheel (44). For this reason, with reference to FIG. 4, it is essential to predetermine a location of such connecting pin (64) in the inner surface of base section (50B) at a neutral line (N2) in relation to the above-defined neutral non-use position (N1) of operation lever (18C), wherein the neutral line (N2) is a rectilinear line extended from a center of rotation (at 28) of the present ratchet mechanism (18), at which line (N2), both pivot and connecting pins (62)(64) are rowed and aligned with each other on the same line, thus providing a complete unlocking point where both first and second pawl portions (60U)(60D) of ratchet pawl (60) are kept out of mesh with the outer gear teeth (44d) of ratchet gear wheel (44).

The above-described lever frame and covers (50)(52) are securely connected together into one integral lever (28C), with the support plate member (40) and return spring (56) interposed therebetween, by fixedly fastening the two securing portions (50b) of lever frame (50) to the inner side of lever cover (52), using securing screws or the like. In this assembly, of course, both holes (50h) and (40h) respectively of the lever frame (50) and plate member (40) are coaxially aligned with each other, so that the former hole (50h) is rotatably attached about the columnar bearing region (44c) of ratchet gear wheel (44), and that the main shaft (44a) of the wheel (44) is rotatably supported in the hole (40h). The lever (18C) is therefore rotatable about the central axis (at 44a) of the ratchet gear wheel (44) and thus about that of brake unit (20).

With the construction described so far, it is seen that the drive mechanism (18), namely the lever (18C) and ratchet gear mechanism (18A) are coaxially connected with the output pinion gear (28a) of brake unit (20).

Referring now to FIG. 1 in conjunction with FIG. 3, it is observed that such output pinion gear (28a) of brake unit (20) is operatively connected with the rotation transmission link means (32) associated with the linkage (10) for interlocking connection with both forward and rearward links (14) (16). As seen from FIG. 1, the rotation transmission link means (32) may comprise a sector gear (32a), an arcuate guide portion (32c) and a connecting link (32b). The sector gear (32a) is rotatably supported, at its lower end, on a pin (32P) fixed to the seat cushion frame (26), the pin (32P) being a center of rotation for the gear (32a). Both sector gear (32a) and arcuate guide portion (32c) are formed together into an integral sector gear having an arcuate slit defined therein. As understandable from FIG. 1, the pinion gear (28a) of brake unit (20) is disposed in such arcuate slit, such that the lower gear region thereof is meshed with the sector gear (32a), while the upper gear region thereof is slidably contacted with the arcuate guide portion (32c). One side of this sector gear unit is pivotally connected with one end of the connecting link (32b). Another end of that connecting link (32b) is in turn pivotally connected with upper half (16b) of rearward link (16). With this arrangement, a rotation output from the brake unit (20) or the drive mechanism (18) can be directly and completely transmitted to the linkage (14, 16) without wobbling and insufficient engagement between the pinion and sector gears (28a) (32a). This means that there is no need to provide any reduction gear mechanism and complicated transmission mechanism in the present lifter (1), and thus, any wobbling or rattling problem is avoided, which is inherent in those mechanisms due to a gear clearance or the like, so that a stable seating touch is attained on the seat (S).

Alternatively, as suggested in FIG. 2, the rotation transmission link means (32) may be embodied by forming together the sector gear (32a), arcuate guide portion (32c) and one end of rearward link (16) into an integral unit without the connecting link (32b) of the foregoing mode shown in FIG. 1.

Now, operation of the above-constructed lifter (1) will be described, with reference to FIGS. 4 to 7.

FIG. 4 generally shows a basic operative motion of the ratchet mechanism (18) described above for ready understanding thereof. As seen from this FIG. 4, the operation lever (18C), when in no use, is set to the neutral non-use position (N1) under the biasing force of second spring ends (56a), while on the other hand, the ratchet base plate (46) is biasingly oriented to and along a line indicated by (N2)(i.e. a neutral position) by the first spring ends (54a). In brief, upward rotation of the lever (18C) in the arrow (UP) from the neutral position (N1) causes simultaneous rotative displacement of the connecting pin (64) relative to the central axis (at 28), which in turn causes the bifurcated ratchet pawl (60) to rotate about the pin (62) anticlockwise, thereby bringing its first pawl portion (60U) to engagement with one valley of the outer gear teeth (44d) as indicated by the arrow ⓐ. At this moment, only the lever (18C) is rotated about the central axis of ratchet gear wheel (44), independently of other adjacent elements (44, 46, 28), to firstly cause such engagement of first pawl portion (60U) with one valley of the gear teeth (44d). Then, continuing on to rotate the lever (18C) further upwardly causes rotation of both ratchet gear wheel (44) and brake unit shaft (28b) in the anticlockwise direction of arrow ①. This rotation causes simultaneous rotation of the pinion gear (28a) of brake unit (20) in the same anticlockwise direction, whereby, referring to FIG. 1, the rotation transmission means (32) or sector gear (32a) meshed with the pinion gear (28a) is caused to rotate about a pin (32P) in the forward arrow direction (F), with the result that the linkage (10) (i.e. both forward and rearward links (14)(16)) is simultaneously raised, to thereby lift the seat (S) upwards as indicated by the arrow (U) to a given level, as will be explained in detail.

Conversely, when the lever (18C) is rotated downwards in the arrow direction (DN) from the neutral position (N1) causes the connecting pin (64) to displace relative to the central axis (at 28), thereby causing the ratchet pawl (60) to rotate about the pin (62) in clockwise direction and thus bringing its second pawl portion (60D) to engagement with one valley of the gear teeth (44d) as indicated by the arrow ⓑ in FIG. 4. Thus, by continuing on to rotate the lever (18C) downwards, both ratchet wheel (44) and brake unit shaft (28b) are rotated in the clockwise direction of arrow ② in FIG. 4. This rotation causes simultaneous rotation of the pinion gear (28a) of brake unit (20) in the same clockwise direction, whereby, referring to FIG. 1, the rotation transmission means (32) or sector gear (32a) meshed with the pinion gear (28a) is caused to rotate about a pin (32P) in the backward arrow direction (B), with the result that the linkage (10) is simultaneously moved downwards, to thereby lower the seat (S) as indicated by the arrow (D) to a given level.

It is therefore appreciated that, by initially rotating the lever (18C) a small amount in a selected one of the upward and downward directions, a user can readily and automatically select a desired corresponding direction for operation of the drive mechanism (18) without any switch-over operation, and then, by continuing to rotate the lever (18C), the linkage (10) is moved in the selected corresponding direction (U or P as in FIG. 1), thereby allowing the user to adjust the height of seat (S) at his or her preferred level.

The foregoing basic principle of operation are also applied to the second linkage mode of FIG. 2 in exactly the same way, and the detailed explanation thereabout is omitted for the sake of simplicity.

Hereinafter, referring to FIGS. 5 to 7, a more specific description will be made of operation and motions of the lifter (1), assuming that it is operated to raise the seat (S).

At first, the operation lever (18C) is shown in FIG. 5 as being normally set at the neutral non-use position (N1) under the biasing force of second spring (56). Owing to this biasing, the bifurcated ratchet pawl (60), connected via the pin (64) with the lever (18C), is also normally set to a neural position where its first and second pawl portions (60U) (60D) are disposed symmetrically relative to the abovementioned neutral line (N2) and thus are both kept out of engagement with the gear teeth (44d) of ratchet gear wheel (44).

Figure 6:
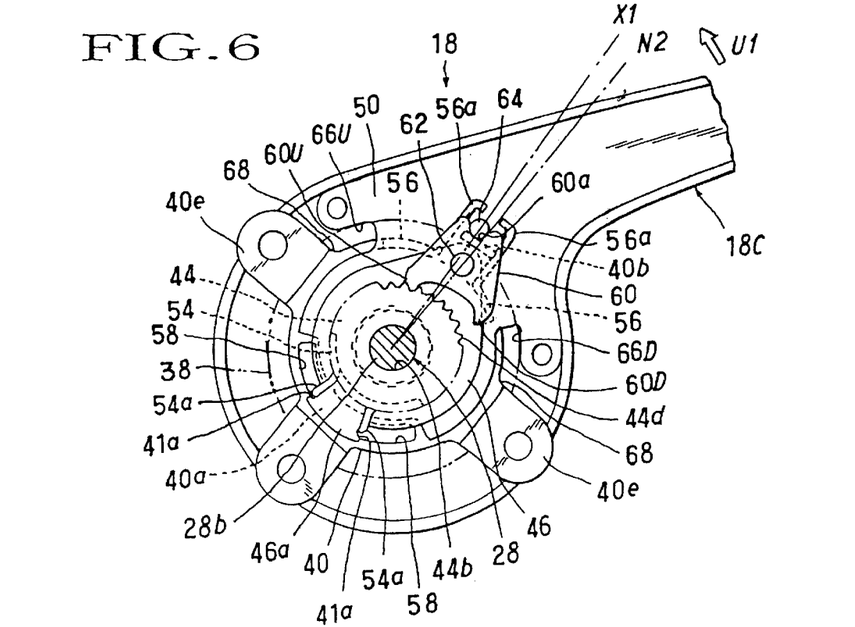
FIG. 6 is a fragmentary, partially sectioned front view of the ratchet-type lever mechanism similar to the FIG. 5, which shows the state where the operation lever is initially rotated in the upward direction.

As shown in FIG. 6, a user who wishes to raise the seat (S) can initially rotate the lever (18c) a small amount in the upward arrow direction (U1) to cause anticlockwise rotation of the bifurcated ratchet pawl (60), thereby bringing the first pawl portion (60U) to engagement in one valley of the gear teeth (44d) and setting the drive mechanism (18) to an upward operative position. In other words, the lever (18C) may be initially rotated by an angle corresponding to an angle at which the pin (64) is displaced from the neutral position (N2) to a position (X1) relative to the rotation center (at 28), so that the user can feel a contact of the first pawl portion (60U) with the gear teeth (44d) to notice that the drive mechanism (18) is ready for upward operation. Then, referring to FIG. 7, as indicated by the arrow (U2), when the user continues to rotate the lever (18c) in a further upward direction, both ratchet gear wheel (44) and shaft (28b) of brake unit (20) are caused to simultaneously rotate in the anticlockwise arrow direction, which in turn causes simultaneous anticlockwise rotation of brake unit pinion gear (28a), whereupon, referring to FIG. 1 or 2, the sector gear (32a) meshed with that pinion gear (28a) is rotated in the forward direction (F), thereby rotatively displacing the whole rotation transmission link means (32) (i.e. 32a, 32b and 32c as in FIG. 1; or 32a and 32c as in FIG. 2) in the forward direction of the seat (S). Such series of rotative actions finally cause both forward and rearward links (14) (16) to move upwards to raise the seat (S) in the upward direction (U).

Figure 7:
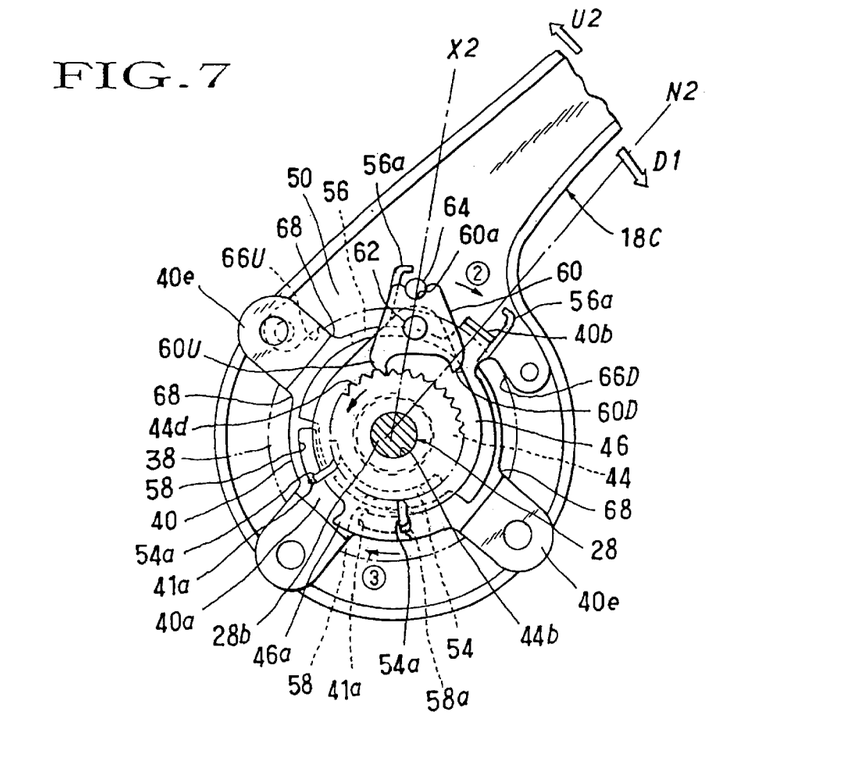
FIG. 7 is a fragmentary, partially sectioned front view of the ratchet-type lever mechanism similar to the FIG. 5, which shows the state where the operation lever is further rotated in the upward direction.

While continuing on to rotated the lever (18C) still further, the user notices its limit of upward rotation, due to the fact that the first notch (66U) slidingly engages and contacts the corresponding side edge (68) of securing leg (44e) of outer support member (40), as can be seen from FIGS. 6 and 7, which prevents the lever (18C) against further upward rotation. Here, it is observed in FIG. 7 that the pin (64) has been displaced further to another position (X2) relative to the rotation center (at 28), which indicates the completion of one stroke of its upward rotation to attain a certain raised level of the seat (S). If the user finds it to be a desired height of the seat (S), he or she may release the lever (18C) to allow the lever itself to be returned in the arrow direction ② to the neutral position (N1) under the biasing force of spring (56), which in turn allows the ratchet base plate (46) to be returned in the arrow direction ③ to the neutral position (N2) under the biasing force of spring (54). At this point, the ratchet gear wheel (44), while having been rotated a certain amount by such one-stroke lever operation, is now locked against rotation due to the braking effect of brake unit (20), which also locks the rotation transmission link means (32) against any movement. Thus, the two links (14)(16) are both locked to a raised level set by the one-stroke lever operation under the braking action of brake unit (20), whereupon the seat (S) is currently set and locked to a certain raised level from the slide rail device (2) or a floor of automobile (not shown).

If it is desired to further raise the seat (S) from the thus-set first level, the user then has to rotate the lever (18C) upwardly from the neutral position (N1) by one more stroke in the same manner as described above and releases it. Of course, he or she can repeat this upward rotation and downward releasing of lever (18C) by plural strokes until the seat (S) is raised to a desired point of level.

On the other hand, to lower the seat (S) in the downward direction (D) as in FIGS. 1 and 2, the operation lever (18C) should only by rotated downwardly as indicated by the arrow (DN) from the neutral non-use position (N1). In this instance, as understandable from FIG. 4, a user initially has to rotate the lever (18C) downwards to bring the second pawl portion (60D) of bifurcated pawl (60) to engagement in one valley of the outer gear teeth (44d) of ratchet gear wheel (44) as indicated by the arrow ⓑ, whereby a downward operative direction is selected on the drive mechanism (18). Then, by continuing on to rotate the lever (18C) downwards, both ratchet gear wheel (44) and shaft (28b) of brake unit (20) are caused to simultaneously rotate in the clockwise direction of arrow ② in FIG. 4, which in turn causes simultaneous clockwise rotation of brake unit pinion gear (28a), whereupon, referring to FIG. 1 or 2, the sector gear (32a) meshed with that pinion gear (28a) is rotated in the rearward direction (B), thereby rotatively displacing the whole rotation transmission link means (32) (i.e. 32a, 32b, and 32c as in FIG. 1; or 32a and 32c as in FIG. 2) in the rearward direction of the seat (S). Those rotative actions finally cause both forward and rearward links (14)(16) to move downwards to lower the seat (S) in the downward direction (D). Still further downward rotation of the lever (18C) results in the second notch (66D) being slidingly engaged and contacted with the corresponding side edge (68) of another securing leg (44e) of outer support member (40), likewise as in the upward lever operation described previously. The lever (18C) is then prevented against further downward rotation, indicating the completion of one stroke of its downward rotation to attain a certain lowered position of the seat (S). If the user finds it to be a desired lowered position of the seat (S), he or she may release the lever (18C) to allow the lever itself to be returned to the neutral position (N1) under the biasing force of spring (56), which in turn allows the ratchet base plate (46) to be returned to the neutral position (N2) under the biasing force of spring (54). If it is desired to further lower the seat (S), the user then should rotate the lever (18C) downwardly from the neutral position (N1) by one more stroke in the same manner as described above and releases it. Of course, he or she can repeat this upward rotation and downward releasing of lever (18C) by plural strokes unit the seat (S) is lowered to a desired lowered point.

From the descriptions above, it is appreciated that the seat lifter (1) or the ratchet-type drive mechanism (18) is much simplified in operation by only rotating the lever (18C) vertically without any particular switch-over operation as found in the prior art, and that the seat lifter (1) per se is simplified in structure since the linkage (10) may be basically formed only by the two links (14) (16) and sector gear arrangement (at 32) without requiring other special transmission gear mechanism. The seat lifter (1) can therefore be assembled easily with a less amount of parts and fittings required.

While having described the present invention thus far, it should be understood that the invention is not limited to the illustrated embodiment, but any other modifications, replacements and additions may be structurally applied thereto without departing from the scopes of the appended claims. For example, the ratchet-type drive mechanism (18) may be used in other seating posture control devices including a reclining device or a seat slide device. Instead of the illustrated bell-crank like rearward link (16), the forward link (14) may be formed in a bell-crank shape, and to such forward link (14), the rotation transmission link means (32) may be arranged.

What is claimed is:

1. A seat lifter for adjustment in height of a vehicle seat, comprising:

a linkage means for operative connection with the vehicle seat, said linkage means including a first link means and a second link means, each link means adapted to be pivotally connected with forward and rearward sides of the vehicle seat, respectively, thereby allowing rotative vertical motion of the linkage means, wherein one of said first and second link means is formed with a bell crank portion in an integral manner;

a drive means operatively connected with said linkage means;

said linkage means including a rotation transmission link means operatively connected between said linkage and drive means such that an operative rotation force applied from the drive means is transformed into said rotative vertical motion of the linkage means;

a brake means for providing a braking action to the rotative vertical motion of said linage means;

said rotation transmission link means including a sector gear means which is in a meshed engagement with said brake means; and said drive means comprising a ratchet-type lever mechanism which includes:
 a support base means;
 a ratchet gear wheel means having: a central axis portion rotatably supported by said support base means and securely connected with said brake means; and an outer gear teeth defined circumferentially thereof;
 a ratchet base means attached rotatably around the central axis portion of said ratchet gear wheel means;
 a lever means attached rotatably around the central axis portion of said ratchet gear wheel means;
 a bifurcated pawl means pivotally attached on said ratchet base means, said bifurcated ratchet pawl means having first and second pawl portions extending from one side thereof, wherein said bifurcated ratchet pawl means is operatively connected with said lever means at another side thereof opposite to said one side, with such an arrangement that the bifurcated ratchet pawl means is selectively rotatable from a neutral position where the bifurcated ratchet pawl means is normally out of engagement with said ratchet gear wheel means, so as to bring a selected one of said first and second pawl portions to engagement with said outer gear teeth of the ratchet gear wheel means;
 a first biasing means for normally biasing said ratchet base means in a direction to said neutral position; and
 a second biasing means for normally biasing said lever means to a neutral non-use position.

2. The seat lifter as defined in claim 1, wherein said rotation transmission link means further includes a connecting link means having one end pivotally connected with said sector gear means and another end pivotally connected with said bell crank portion formed with said one of said first and second link means.

3. The seat lifter as defined in claim 1, wherein said rotation transmission link means is defined integrally in one of said first and second link means such that said sector gear means is integrally formed with said bell crank portion.

4. The seat lifter as defined in claim 1, wherein said ratchet base means has first and second end portions which are diametrically opposed with each other, wherein said bifurcated ratchet pawl means is pivotally attached on said first end portion of the ratchet base means, wherein said first biasing means has a resilient connection portion for resiliently connecting said second end portion of the ratchet base means with said support base means to thereby bias the ratchet base means in the direction to said neutral position, wherein said second biasing means also has a resilient connection portion for resiliently connecting said lever means with said support base means to thereby bias the lever means to said neutral non-use position, and wherein said resilient connection portion of said first biasing means is disposed in a diametrically opposed relation with said resilient portion of said second biasing means with respect to said central axis portion of the ratchet gear wheel means.

5. The seat lever as defined in claim 1, wherein said support base means of said ratchet-type lever mechanism comprises a first support member and a second support member, both of which are secured together to accommodate therein said ratchet-type lever mechanism, wherein said first support member includes: a hole in which said central axis portion of the ratchet gear wheel means is rotatably supported; and at least two securing legs formed peripherally thereof, wherein said second support member has a hole through which said ratchet gear wheel means is connected with said brake means, said hole being coaxial with the hole of said first support member, wherein said lever means includes a base portion having a hole rotatably attached about said central axis portion of the ratchet gear wheel means, said base portion further having a pair of notches formed therein, and wherein rotation of said lever is limited when one of said pair of notches contacts one of said at least two securing legs of the second support member.

6. The seat lifter as defined in claim 1, wherein said brake means has a pinion gear, and wherein said rotation transmission link means further comprises an arcuate guide portion which is formed circumferentially of said sector gear means such that said pinion gear is partly in mesh with said sector gear means and partly slidably contacted with said arcuate guide portion.

7. The seat lifter as defined in claim 1, wherein said central axis portion of said ratchet gear means comprises a shaft portion defined coaxially thereof and an intermediate columnar bearing region defined between said shaft portion and said outer gear teeth, such that all said shaft portion, intermediate columnar bearing region and outer gear teeth are formed integrally together and coaxially with said central axis portion, and wherein, said ratchet base means and lever means are rotatably attached about said intermediate columnar bearing region.

8. A ratchet-type lever mechanism for adjustment in position of a vehicle seat, comprising:
 a support base means;
 a ratchet gear wheel means having: a central axis portion rotatably supported by said support base means; and an outer gear teeth defined circumferentially thereof;
 a brake means operatively connected with said central axis portion of said ratchet gear wheel means, said brake means being adapted for providing a braking action to said ratchet gear wheel means;
 said brake means having a connection portion;
 a ratchet base means attached rotatably around the central axis portion of said ratchet gear wheel means;
 a lever means attached rotatably around the central axis portion of said ratchet gear wheel means;
 a bifurcated ratchet pawl means pivotally attached on said ratchet base means, said bifurcated ratchet pawl means having first and second pawl portions extending from one side thereof, wherein said bifurcated ratchet pawl means is operatively connected with said lever means at another side thereof opposite to said one side, with such an arrangement that the bifurcated ratchet pawl means is selectively rotatable from a neutral position where it is normally out of engagement with said ratchet gear wheel means, so as to bring a selected one of said first and second pawl portions to engagement with said outer gear teeth of the ratchet gear wheel means;

a first biasing means for normally biasing said ratchet base means in a direction to said neutral position; and a second biasing means for normally biasing said lever means to a neutral non-use position.

9. The ratchet-type lever mechanism for adjustment in position of a vehicle seat according to claim 8, wherein said connection portion of said brake means is connectable with a device for adjustment in position of the vehicle seat.

* * * * *